United States Patent
Kong (10) Patent No.: US 9,021,391 B2
(45) Date of Patent: Apr. 28, 2015

(54) IMAGE FORMING APPARATUS ABLE TO RE-EXECUTE WORKFLOW AND METHOD THEREOF

(75) Inventor: Tae-kook Kong, Suwon-si (KR)

(73) Assignee: Samsung Electronics Co., Ltd., Suwon (KR)

( * ) Notice: Subject to any disclaimer, the term of this patent is extended or adjusted under 35 U.S.C. 154(b) by 685 days.

(21) Appl. No.: 12/366,824

(22) Filed: Feb. 6, 2009

(65) Prior Publication Data

US 2010/0031192 A1 Feb. 4, 2010

(30) Foreign Application Priority Data

Jul. 30, 2008 (KR) .................................. 2008-74792

(51) Int. Cl.
*G06F 3/048* (2013.01)
*H04N 1/00* (2006.01)
*G06F 3/12* (2006.01)

(52) U.S. Cl.
CPC ............... *H04N 1/00* (2013.01); *H04N 1/0097* (2013.01); *G06F 3/1234* (2013.01); *G06F 3/1296* (2013.01)

(58) Field of Classification Search
CPC . G06F 3/1296; G06F 3/1234; H04N 1/00204; H04N 2201/0082
USPC ......................................... 715/810; 358/1.15
See application file for complete search history.

(56) References Cited

U.S. PATENT DOCUMENTS

| | | | | |
|---|---|---|---|---|
| 7,126,717 B2* | 10/2006 | Jeyachandran et al. | ......... | 358/1.9 |
| 7,187,478 B2* | 3/2007 | Mikame et al. | ............... | 358/468 |
| 7,557,950 B2* | 7/2009 | Hatta et al. | ..................... | 358/1.9 |
| 7,743,364 B2* | 6/2010 | Nakata et al. | ................. | 717/122 |
| 8,171,404 B2* | 5/2012 | Borchers et al. | .............. | 715/272 |
| 2005/0052684 A1* | 3/2005 | Ferlitsch | ...................... | 358/1.15 |
| 2006/0050292 A1* | 3/2006 | Morikawa et al. | ........... | 358/1.13 |
| 2006/0061808 A1* | 3/2006 | Miyahara et al. | ............ | 358/1.15 |
| 2007/0028207 A1* | 2/2007 | Nakata et al. | .............. | 717/100 |
| 2007/0057978 A1* | 3/2007 | Hagiwara | ......................... | 347/5 |
| 2007/0103724 A1* | 5/2007 | Jeyachandran et al. | ...... | 358/1.15 |
| 2007/0136087 A1* | 6/2007 | Yamaguchi | ...................... | 705/1 |
| 2007/0176946 A1* | 8/2007 | Matoba | ......................... | 345/619 |
| 2008/0055646 A1* | 3/2008 | Kawabata | .................... | 358/1.16 |
| 2008/0259387 A1* | 10/2008 | Hirai | ............................. | 358/1.15 |
| 2010/0225963 A1* | 9/2010 | Kuroshima | .................. | 358/1.15 |
| 2010/0296123 A1* | 11/2010 | Maruyama et al. | .......... | 358/1.15 |

FOREIGN PATENT DOCUMENTS

| | | |
|---|---|---|
| JP | 11-134300 | 5/1999 |
| JP | 2007-208440 | 8/2007 |

OTHER PUBLICATIONS

European Search Report issued Feb. 3, 2010 in EP Application No. 09156263.7.
Korean Office Action dated Oct. 30, 2013 issued in KR Application No. 10-2008-0074792.

* cited by examiner

*Primary Examiner* — Anil Bhargava

(74) *Attorney, Agent, or Firm* — Staas & Halsey LLP (57) ABSTRACT

A method of re-executing a workflow and an image forming apparatus able to re-execute a workflow. The method of re-executing a workflow includes accessing a job history illustrating a result of executing one or more workflows, displaying the accessed job history, selecting a workflow to be re-executed from the displayed job history, and re-executing the selected workflow.

17 Claims, 8 Drawing Sheets

IMAGE FORMING APPARATUS ABLE TO RE-EXECUTE WORKFLOW AND METHOD THEREOF

CROSS-REFERENCE TO RELATED APPLICATIONS

This application claims priority under 35 U.S.C. §119(a) from Korean Patent Application No. 10-2008-0074792, filed on Jul. 30, 2008, in the Korean Intellectual Property Office, the disclosure of which is incorporated herein by reference in its entirety.

BACKGROUND OF THE INVENTION

1. Field of the Invention

The present general inventive concept relates to an image forming apparatus able to re-execute a workflow and a method thereof. More particularly, the present general inventive concept relates to a method of re-executing a workflow using a job execution result displayed on an image forming apparatus, and an image forming apparatus able to re-execute a workflow.

2. Description of the Related Art

Network image forming systems are able to perform various functions, for example, as document transmission systems. Document transmission systems enable one or more user terminals to share a plurality of image forming apparatuses, so if a user selects one from among a plurality of workflows transmitted from an image forming apparatus to a server, the selected workflow may be executed. Workflows refer to flowcharts consisting of a plurality of jobs, for example, a 'Scan to OCR to Email' workflow includes functions of scanning a document, converting the scanned document using an optical character recognition (OCR) function, and transmitting the converted document to an e-mail address of a corresponding receiving device.

A workflow selected by a user may fail due to the execution environment, for example, errors in a network or insufficient toner. A server stores a result of executing the selected workflow, namely a job execution result. Accordingly, it is possible for a user to monitor the job execution result from the server connected to an image forming apparatus.

However, in a conventional document transmission system, if a user desires to re-execute unsuccessful workflows or successful workflows while monitoring a job history, he or she needs to receive desired workflows from a server again, and to request execution of the received workflows, which causes user inconvenience.

SUMMARY OF THE INVENTION

The present general inventive concept provides a method of re-executing a workflow so that a user can request re-execution of desired jobs using a job history, and an image forming apparatus able to re-execute a workflow.

According to the method of re-executing a workflow and the image forming apparatus able to re-execute a workflow in accordance with aspects of the present general inventive concept, workflows stored in the job history may be re-executed and edited through a graphical user interface (GUI) of the image forming apparatus.

Additional aspects and utilities of the present general inventive concept will be set forth in part in the description which follows and, in part, will be obvious from the description, or may be learned by practice of the general inventive concept.

Embodiments of the present general inventive concept may be achieved by providing a method of re-executing a workflow in an image forming apparatus, the method including accessing a job history illustrating a result of executing one or more workflows, displaying the accessed job history, selecting a workflow to be re-executed from the displayed job history, and re-executing the selected workflow.

The job history may be displayed on a screen of the image forming apparatus, and the screen may include a menu to receive a workflow re-execution command.

The job history may be stored in at least one of the image forming apparatus, a server of the workflow, and one or more host devices connected via a network to the image forming apparatus.

The method may further include, if the job history is stored in the image forming apparatus or the one or more host devices, determining whether to update the job history, updating the job history and accessing the job history if it is determined necessary to update the job history, and accessing the job history if it is determined unnecessary to update the job history.

The displaying of the accessed job history may include classifying the one or more workflows of the job history into successful workflows and unsuccessful workflows and displaying the classified workflows.

The method may further include, after selecting the workflow, providing a menu to change conditions for re-executing the selected workflow, and changing the conditions for re-executing the selected workflow using the menu.

The method may further include, after executing the workflow, adding a result of re-executing the selected workflow to the job history stored in the at least one of the image forming apparatus, server of the workflow, and one or more host devices.

Accessing the job history may include requesting for a user to access the job history using the image forming apparatus, and performing user authentication to access the job history.

Embodiments of the present general inventive concept may be achieved by providing an image forming apparatus able to re-execute a workflow, including a communication unit to be connected to a server or host device in which a job history illustrating a result of executing one or more workflows is stored, and to receive the stored job history, a display unit to display the received job history, a user input unit to receive input selecting a workflow to be re-executed from the displayed job history, and a control unit to control the selected workflow to be re-executed.

The display unit may display the job history on a preset screen, and the displayed job history may include a menu to receive a workflow re-execution command.

The control unit may classify the one or more workflows of the job history into successful workflows and unsuccessful workflows and display the classified workflows on the display unit.

The control unit may display a menu to change conditions for re-executing the selected workflow on the display unit.

The server or host device may record onto the job history a result of re-executing the selected workflow transmitted from the communication unit.

The communication unit may receive the job history from the host device if a user logs onto the host device through a user authentication process.

The host device may receive the job history from the server, store the received job history, and transmit the job history to the communication unit.

Embodiments of the present general inventive concept may be achieved by providing an image forming apparatus able to re-execute a workflow, including a storage unit to store a job history illustrating a result of executing one or more workflows, a display unit to display the stored job history, a user input unit to receive input selecting a workflow to be re-executed from the displayed job history, and a control unit to control the selected workflow to be re-executed.

The display unit may display the job history on a preset screen, and the displayed job history may include a menu to receive a workflow re-execution command.

The display unit may display a screen to determine whether to update the job history. If a user determines to update the job history, the control unit may update the job history and display the updated job history, and if the user determines not to update the job history, the control unit may control the display unit to only display the stored job history.

The control unit may classify one or more workflows of the job history into successful workflows and unsuccessful workflows and display the classified workflows on the display unit.

The control unit may display a menu to change conditions for re-executing the selected workflow on the display unit.

The control unit may add a result of re-executing the selected workflow to the job history.

Embodiments of the present general inventive concept may be achieved by providing a method of re-executing a workflow, the method including a user connecting to a server in which a job history illustrating a result of executing one or more workflows is stored, using a user terminal; receiving the stored job history from the server and displaying the received job history, the receiving performed by the user terminal; selecting a workflow to be re-executed from the displayed job history; and re-executing the selected workflow.

The job history displayed on the user terminal may be a web page.

Embodiments of the present general inventive concept may be achieved by providing a method of re-executing a workform through an image forming apparatus, the method comprising: interacting with a workform via a displayed listing of stored and executed workforms; selecting a workform to be re-executed from the displayed listing; and re-executing the selected workform.

Embodiments of the present general inventive concept may be achieved by providing a server able to re-execute a workform, comprising: a communication unit to communicate with a host device or an image forming apparatus in which job history and workforms are received, stored, and transmitted; a user manipulator to output a signal to select and request workforms to be re-executed; a workform management unit to write or edit workforms in response to user manipulator signals; and a control unit to control the selected workforms to be re-executed to the image forming apparatus in response to requests from the image forming apparatus.

BRIEF DESCRIPTION OF THE DRAWINGS

Embodiments of the present general inventive concept will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 1:
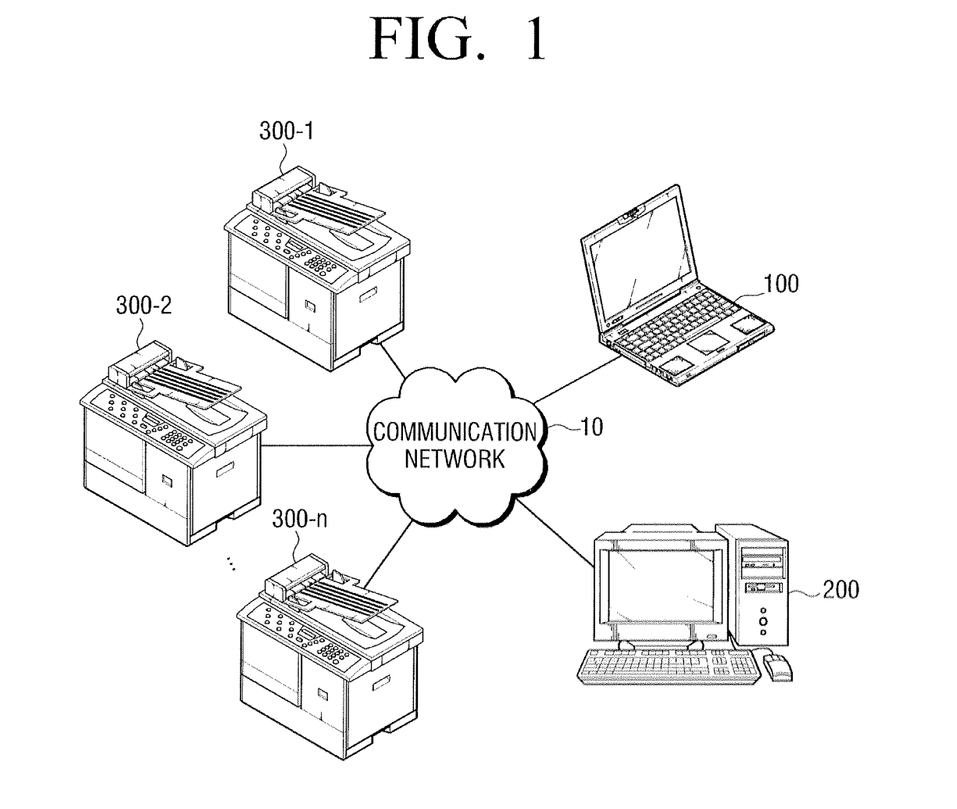
FIG. 1 illustrates a document transmission system according to an exemplary embodiment of the present general inventive concept.

FIG. 1 illustrates a document transmission system according to an exemplary embodiment of the present general inventive concept.

In FIG. 1, the document transmission system includes a host device 100, a server 200, and first to n-th image forming apparatuses 300-1, 300-2, . . . , 300-n (here, n is a positive integer). The host device 100, the server 200, and the first to n-th image forming apparatuses 300-1, 300-2, . . . , 300-n are communicably connected to each other through a communication network 10. The host device 100 and the server 200 may be an apparatus capable of performing wired or wireless communication, for example a personal computer (PC), a personal digital assistant (PDA), a laptop or the like. If a plurality of host devices are connected via the communication network 10, the plurality of host devices may communicate with the first to n-th image forming apparatuses 300-1, 300-2, . . . , 300-n.

The server 200 can store login information (for example, identifications (IDs) and passwords) of users pre-registered, and a plurality of workforms set for each of the users. Additionally, the server 200 can be equipped with a workform management solution to write workforms. The server 200 may be a server through which an administrator is able to manage a workflow, or may be a user terminal usable by general users. If the server 200 is a user terminal, a workform management solution may not be installed in the user terminal.

The workform can include all types of information required for the first to n-th image forming apparatuses 300-1, 300-2, . . . , 300-n to perform various jobs. The workform may include a plurality of pieces of information regarding a workflow showing an order for processing jobs, a device to perform the jobs, a plurality of job conditions or a job history, namely a job execution result. If the stored workforms are used, a user may select one of a plurality of defined workforms so that a job can be performed automatically without setting job conditions whenever each of the first to n-th image forming apparatuses 300-1, 300-2, . . . , 300-n is used.

If the user logs onto the server 200 through the host device 100 or the first to n-th image forming apparatuses 300-1, 300-2, . . . , 300-n, the server 200 may authenticate the user using pre-stored login information. The server 200 also allows the user, who has been authenticated, to write or edit workforms using a graphical user interface (GUI) screen provided by the workform management solution. The server 200 may write the workform in web language such as extensible Markup Language (XML) in response to a user request.

The first to n-th image forming apparatuses 300-1, 300-2, ..., 300-n may be apparatuses capable of forming images such as multifunctional apparatuses, printers, facsimile machines, scanners, copiers, or the like. Each of the first to n-th image forming apparatuses 300-1, 300-2, ..., 300-n includes a program set to communicate with the host device 100 and the server 200, and a programmed GUI necessary to request a workform re-execution.

The first to n-th image forming apparatuses 300-1, 300-2, ..., 300-n receive workforms selected by a user from the server 200, display the received workforms, and operate according to a job selected from among the displayed workforms. For example, if a user selects 'Scan to print' from among the workforms displayed on the first image forming apparatus 300-1, the first image forming apparatus 300-1 may scan a document and transmit scanned data to the second image forming apparatus 300-2 via the communication network 10, and the second image forming apparatus 300-2 may print the scanned data onto paper.

The communication network 10 may be established by a cable connected to a general parallel port, a cable connected to a universal serial bus (USB) port, an Internet network, or wireless network established by a hub or a local area network (LAN).

Figure 2:
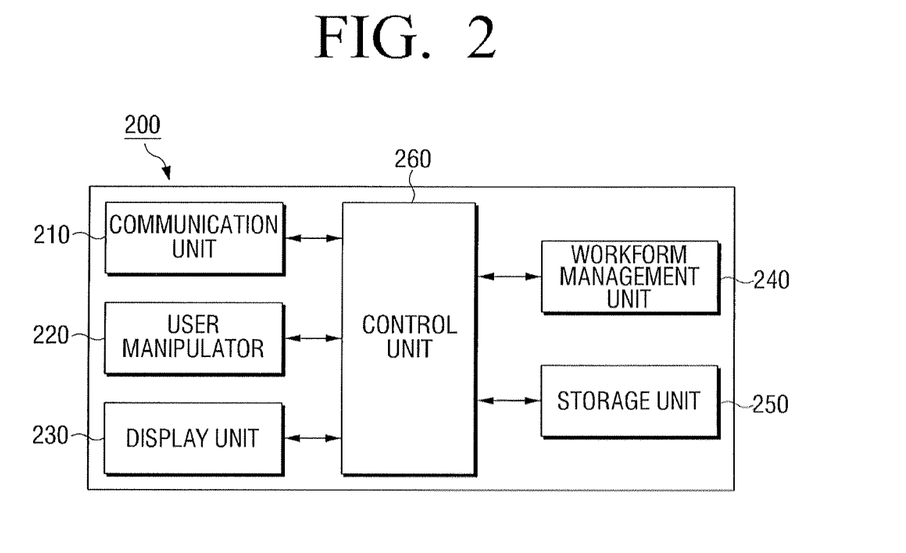
FIG. 2 illustrates a block diagram of a server illustrated in FIG. 1 according to an exemplary embodiment of the present general inventive concept.

FIG. 2 illustrates a block diagram of the server 200 illustrated in FIG. 1.

Referring to FIGS. 1 and 2, the server 200 includes a communication unit 210, a user manipulator 220, a display unit 230, a workform management unit 240, a storage unit 250 and a control unit 260.

The communication unit 210 can be communicably connected to the host device 100 and the first to n-th image forming apparatuses 300-1, 300-2, ..., 300-n via the communication network 10. The communication unit 210 can receive user authentication information from the host device 100 or the first to n-th image forming apparatuses 300-1, 300-2, ..., 300-n, and can transmit the workforms and job history to the host device 100 or the first to n-th image forming apparatuses 300-1, 300-2, ..., 300-n.

The user manipulator 220 can be a user interface such as a keyboard or mouse, and the user manipulator 220 outputs a signal to select and request functions supported by the server 200. When a user desires to manually make a workform using the server 200, a request to implement a solution related to writing of workforms can be received from the user manipulator 220, and the display unit 230 can display a workform screen provided by the workform management unit 240.

The workform management unit 240 can write or edit workforms in response to a user command by implementing a workform management solution. The workform management unit 240 can generate an initial screen to write workforms and a pre-written workform screen, and may write workforms in response to a user request received through the generated screens. The written workforms are transmitted to the host device 100 which the user logs onto or the first image forming apparatus 300-1, and stored or displayed on the host device 100 or the first image forming apparatus 300-1. Additionally, the user may edit information of the workforms using user interfaces for the received workforms or requests jobs.

The storage unit 230 may store various programs required to operate the server 200, an operating system (OS), a workform management solution, a program to drive the workform management solution, and various types of data generated when the operation of the server 200 is performed. Additionally, the storage unit 230 may store user authentication information, workforms written for each user, a job history, data required to write workforms, or information regarding IDs for the first to n-th image forming apparatuses 300-1, 300-2, ..., 300-n. The job history shows a result of executing jobs that have already been performed among one or more workflows, namely jobs, contained in workforms. The result of executing jobs may include a variety of information such as information regarding a date on which a job is executed, a user's ID, a name of an image forming apparatus, a workflow, or information regarding whether a job is successful or unsuccessful.

The control unit 260 may control the overall operation of the server 200 using various programs stored in the storage unit 230. The control unit 260 may launch a workform management solution, and may control the communication unit 210 so that the server 200 transmits the workforms to the first to n-th image forming apparatuses 300-1, 300-2, ..., 300-n or the host device 100 when the pre-written workforms are changed or when a user request is received. The control unit 260 may transmit the workforms or job history to the first to n-th image forming apparatuses 300-1, 300-2, ..., 300-n in response to requests of the first to n-th image forming apparatuses 300-1, 300-2, ..., 300-n.

Figure 3:
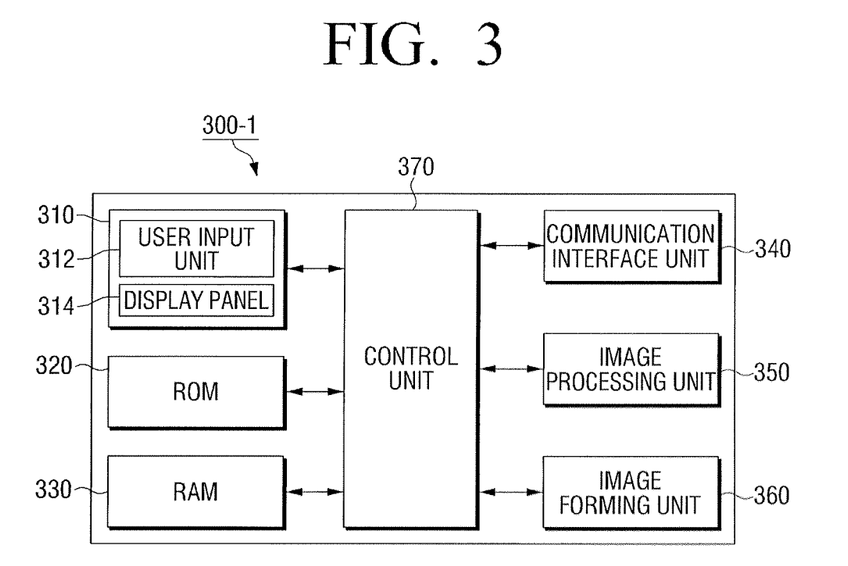
FIG. 3 illustrates a block diagram of a first image forming apparatus illustrated in FIG. 1 according to an exemplary embodiment of the present general inventive concept.

FIG. 3 illustrates a block diagram of the first image forming apparatus 300-1 illustrated in FIG. 1.

Referring to FIGS. 1 to 3, the first image forming apparatus 300-1 with the ability to re-execute a workflow may include an operating panel unit 310, a read only memory (ROM) 320, a random access memory (RAM) 330, a communication interface unit 340, an image processing unit 350, an image forming unit 360, and a control unit 370. The second to the n-th image forming apparatuses 300-2, ..., 300-n may be configured in the same manner as or in a similar manner to the first image forming apparatus 300-1, so no further description thereof is required.

The operating panel unit 310 may include a user input unit 312 and a display panel 314. The user input unit 312 receives a user command input by a user and transmits a request in response to the received user command to the control unit 370. The user may request desired functions using various function keys or a touch screen which are included in the user input unit 312. Additionally, the user input unit 312 may include a workflow button. The workflow button can enable a user to request a function of receiving the workforms or job history from the server 200 and displaying the received workforms or job history.

The display panel 314 can be controlled by the control unit 370 to display information on the state of the first image forming apparatus 300-1, and to display the workforms and job history which are received from the server 200 in the form of GUIs. For example, the display panel 314 in FIG. 4 displays a GUI.

Figure 4:
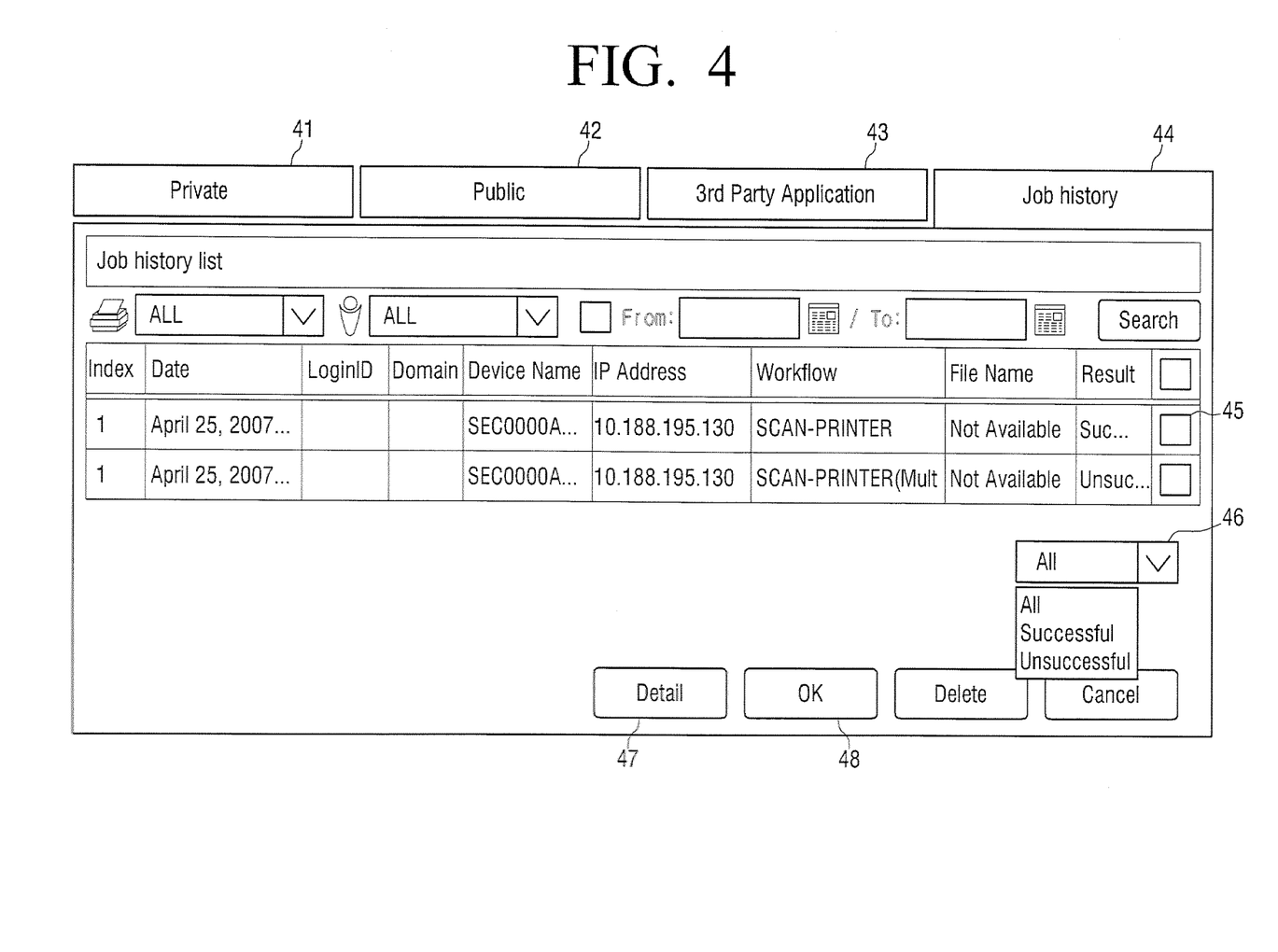
FIGS. 4 and 5 illustrate an exemplary graphical user interface (GUI) to re-execute workflows displayed on an image forming apparatus according to an exemplary embodiment of the present general inventive concept.

Referring to FIG. 4, the GUI includes a private tab 41, a public tab 42, a 3rd application tab 43, and a job history tab 44. The private tab 41 can display a list of private workflows, and the public tab 42 can display a list of public workflows formed by an administrator. The 3rd application tab 43 can display a list of workflows for data transmission and reception with other applications, and the job history tab 44 can display the result of executing jobs performed in response to a user request. While the GUI and tabs of FIG. 4 illustrate information regarding the workforms in the exemplary embodiment of the present general inventive concept, there is no limitation to the information on the workforms.

If a user selects the job history tab 44 using the user input unit 312, the display panel 314 can display the job history containing a variety of information, such as a date on which a job is executed, a user's ID, a name of an image forming apparatus, a workflow, or information regarding whether a job was successful or unsuccessful. Additionally, the display panel 314 may display a check box 45 corresponding to each job, so the user may select the displayed check box 45 when he or she desires to re-execute a job. If the user selects one or more jobs, and presses an 'OK' button 48, the control unit 370 may control the one or more selected jobs to be re-executed.

A button 46 displayed as 'V' may be selected when a user desires to classify the executed jobs into successful jobs and unsuccessful jobs. If the user selects the button 46, a sub-menu to classify jobs may be displayed. If the user selects 'All' from the displayed sub menu, all the executed jobs, namely the successful jobs and unsuccessful jobs, may be displayed on the job history tab 44. Alternatively, if the user selects 'Successful' from the displayed sub-menu, only the successful jobs may be classified and displayed on the job history tab 44, and if the user selects 'Unsuccessful' from the displayed sub menu, only the unsuccessful jobs may be classified and displayed on the job history tab 44.

A 'Detail' button 47 may be selected when a user desires to change job conditions to re-execute jobs. If the user selects the 'Detail' button 47, a GUI illustrated in FIG. 5 may be displayed on the display panel 314. The user may change job conditions or workflows by selecting or clearing boxes on the GUI illustrated in FIG. 5.

Referring back to FIG. 3, the ROM 320 may store various control programs necessary to realize the functions of the first image forming apparatus 300-1 and a program required to parse workforms received from the server 200. The RAM 330 may store various types of data generated when the first image forming apparatus 300-1 is operated.

The communication interface unit 340 may be communicably connected to the server 200 via the communication network 10, and supports an interface between the first to n-th image forming apparatuses 300-1, 300-2, . . . , 300-n. Accordingly, the communication interface unit 340 may be implemented as a network interface card. For example, the first image forming apparatus 300-1 may transmit data scanned by the image forming unit 360 to another apparatus, for example, the second image forming apparatus 300-2, and may cause the other apparatus to print the scanned data. The communication interface unit 340 may output the workforms and job history received from the server 200 to the image processing unit 350.

The image processing unit 350 may process the received workforms and job history to be displayed on a pre-set screen. For example, the image processing unit 350 can allow the received workforms and job history to be displayed corresponding to the private tab 41, the public tab 42, the 3rd application tab 43, and the job history tab 44. A screen to provide a function of requesting jobs through the job history tab 44 as illustrated in FIG. 4 may be preset in the first image forming apparatus 300-1, or may be standardized by the server 200 and transmitted to the first image forming apparatus 300-1.

The image forming unit 360 can generate image data of a document and form an image. For example, if the image forming unit 360 includes a scanner (not illustrated), a print engine (not illustrated), and a modem (not illustrated), the image forming unit 360 may scan a document, perform printing on paper, perform copying, or perform fax data transmission and reception. Additionally, if the image forming unit 360 has a e-mail transmission function, the image forming unit 360 may store a scanned document, printed document or copied document, and may e-mail the stored document.

The control unit 370 can control an overall operation of the first image forming apparatus 300-1 using a control program stored in the ROM 320. If a user selects a workflow button, the control unit 370 can control the communication interface unit 340 and try to access the server 200. After connecting to the server 200, the control unit 370 can cause the display panel 314 to display a login screen. If the user enters his or her ID and password, the control unit 370 can control the communication interface unit 340 so that the ID and password may be transmitted to the server 200.

If the server 200 completely authenticates the user, the server 200 can transmit the workforms and job history to the first image forming apparatus 300-1. The control unit 370 can parse the workforms and job history received via the communication network 10 and communication interface unit 340, and controls the image processing unit 350 and the display panel 314 so that the GUI illustrated in FIG. 4 is displayed on the display panel 314.

If the user selects the job history tab 44 through the GUI illustrated in FIG. 4 and selects a job he or she desires to re-execute from a list of a plurality of jobs displayed by selecting the job history tab 44, the control unit 370 can process the selected job to be re-executed. For example, if the user selects a 'Scan to print' job, the control unit 370 may scan a document and control the image forming unit 360 and the communication interface unit 340 so that the scanned data may be transmitted to the second image forming apparatus 300-2 via the communication network 10 and may be printed onto paper by the second image forming apparatus 300-2.

The control unit 370 can cause a result of re-executing jobs, namely information regarding whether the job is successful or unsuccessful, to be added to the job history, and can transmit the result of re-executing jobs to the server 200. Accordingly, the job list displayed by selecting the job history tab 44 of FIG. 4 may display the result of re-executing jobs.

If the user selects the button 46, the control unit 370 controls the image processing unit 350 and the display panel 314 to further generate a GUI for classifying jobs and display the generated GUI. If the user selects one from among 'All', 'Successful', and 'Unsuccessful' displayed by selecting the button 46, the control unit 370 can classify the executed jobs according to the selection of the user. For example, if 'Successful' is selected, the control unit 370 may filter the successful jobs from the executed jobs and control the image processing unit 350 so that a list of the successful jobs may be appear on the job history tab 44.

Figure 5:
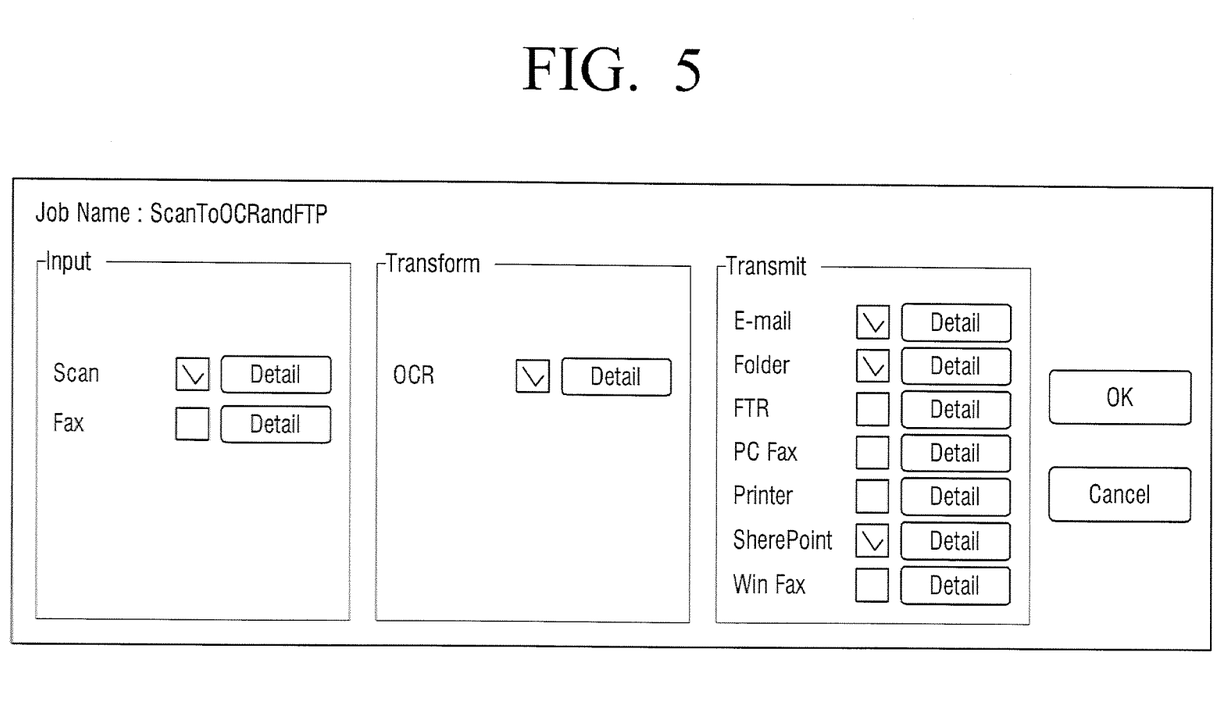

Additionally, if the user selects the 'Detail' button 47, the control unit 370 can control the GUI illustrated in FIG. 5 to be displayed. If the user changes the job conditions through the GUI illustrated in FIG. 5, the control unit 370 can control the first image forming apparatus 300-1 to re-execute the selected job according to the changed job conditions.

The job history stored in the server 200 may be stored in the host device 100. In more detail, if the user accesses the server 200 using the host device 100 and requests to receive the job history from the server 200, the server 200 can transmit the job history to the host device 100 so that the job history is stored in a storage medium (not illustrated) of the host device 100. If the first image forming apparatus 300-1 is connected to the host device 100 and requests to receive the job history from the host device 100, the host device 100 can transmit the job history to the first image forming apparatus 300-1. In this situation, if the user requests to update the job history stored in the host device 100 through a menu screen (not illustrated), the host device 100, which is connected to the server 200, receives a recent job history, updates the recent job history, and then sends the updated job history to the first image forming apparatus 300-1.

Figure 6:
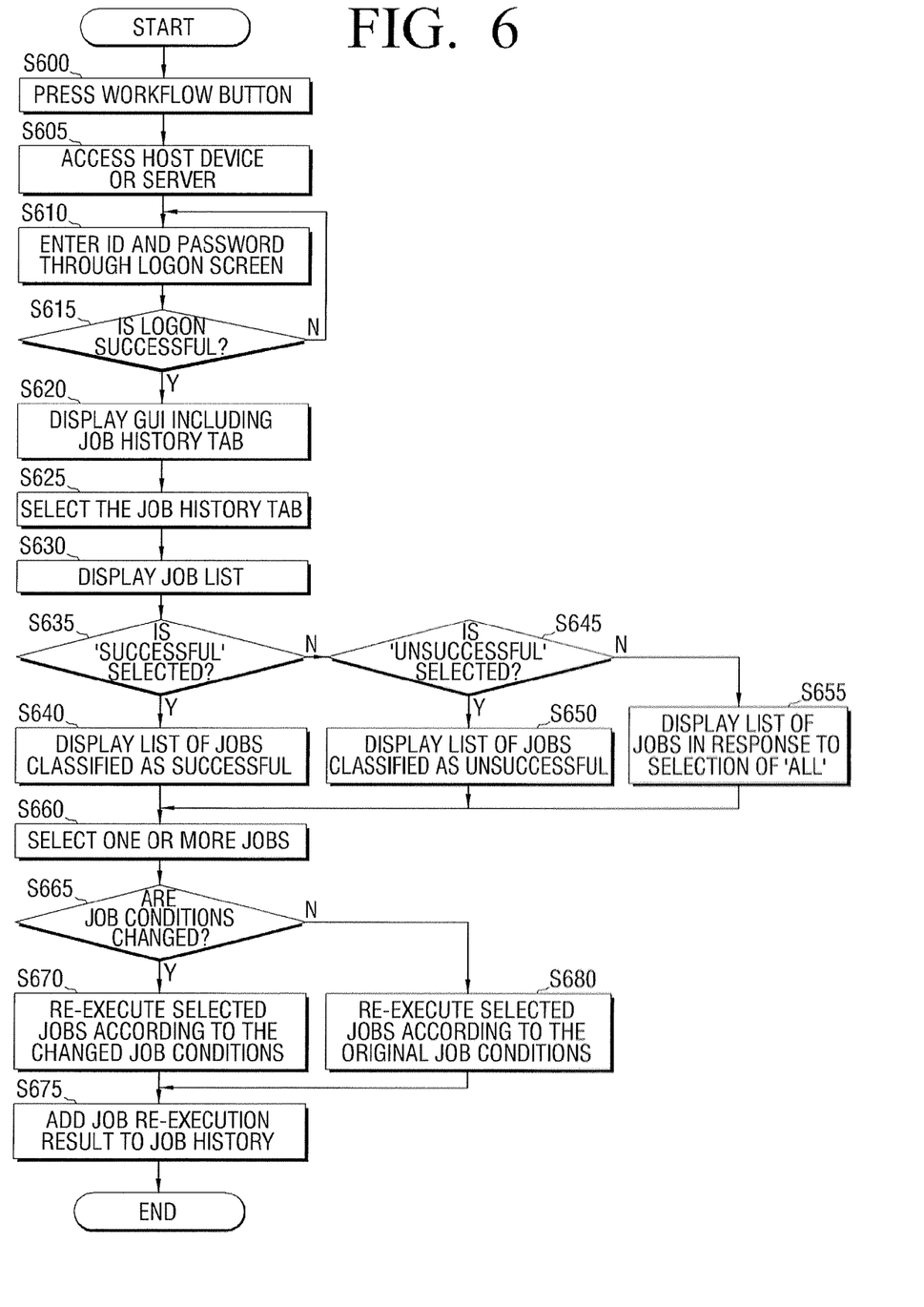
FIG. 6 is a flowchart illustrating a method to re-execute a workflow in an image forming apparatus according to an exemplary embodiment of the present general inventive concept.

Hereinafter, a method by which the first image forming apparatus 300-1 accesses the job history stored in the host device 100 or in the server 200, displays the job history, and re-executes one or more workflows, will be described with reference to FIG. 6.

If a user presses the workflow button of the user input unit 312 in operation S600, the control unit 370 can control the communication interface unit 340 to try to access the host device 100 or the server 200 in operation S605.

If the access attempt is successful, the control unit 370 can cause the display panel 314 to display the login screen. If the user enters his or her ID and password, the control unit 370 can control the communication interface unit 340 so that the ID and password are transmitted to the host device 100 or the server 200 in operation S610.

If the host device 100 or the server 200 performs user authentication using the received ID and password and login is successful in operation S615, the control unit 370 can control the display panel 314 to display a GUI associated with workflows in operation S620.

If the user selects the job history tab 44 through the displayed GUI in operation S625, the control unit 370 can cause the job list to appear by selecting the job history tab 44 to be displayed on the display panel 314 in operation S630.

If the user clicks on the button 46, and selects 'Successful' from the sub-menu in operation S635, the control unit 370 can classify successful jobs from the job list and can control the image processing unit 350 and display panel 314 so that a list of the jobs classified as successful are displayed on the display panel 314 in operation S640.

Alternatively, if the user selects 'Unsuccessful' in operation S645, the control unit 370 may classify unsuccessful jobs from the job list and can control the image processing unit 350 and display panel 314 so that a list of the jobs classified as unsuccessful are displayed on the display panel 314 in operation S650.

If neither 'Successful' nor 'Unsuccessful' are selected in operations S635 and S645, the control unit 370 ensures the GUI continues to be displayed after operation S630, in operation S655. In other words, the control unit 370 can control a list of jobs in response to a user selection of 'All' to be displayed.

After operations S640, S650, or S655, the user may select one or more jobs he or she desires to re-execute from the displayed lists. If the user selects one or more jobs in operation S660, and requests a change in job conditions of the one or more selected jobs in operation S665, the control unit 370 can control the display panel 314 to display a GUI to change the job conditions, as illustrated in FIG. 5.

If the job conditions are changed using the GUI displayed after operation S655, in operation S665-Y, the control unit 370 can control the one or more jobs selected in operation S660 to be re-executed according to the changed job conditions in operation S670.

If the selected one or more jobs are completely re-executed, the control unit 370 can add the job re-execution result to the job history of FIG. 4, and control the communication interface unit 340 so that the job re-execution result is transmitted to the server 200 in operation S675. Therefore, it is possible for the user to know directly whether a job re-execution is successful or unsuccessful. Additionally, if the user desires to use the job history later, the updated job history may be received from the server 200.

If the job conditions are not changed in operation S665-N, the control unit 370 can process the one or more selected jobs to be re-executed according to the original job conditions, in operation S680.

Referring to FIGS. 1 to 6, according to the exemplary embodiment of the present general inventive concept, it is possible for the user to request re-execution of workflows using the job history in the image forming apparatus. Accordingly, it is possible for the user to receive the workforms from the server 200 and to easily select desired jobs from a job history list without needing to perform several operations.

Figure 7:
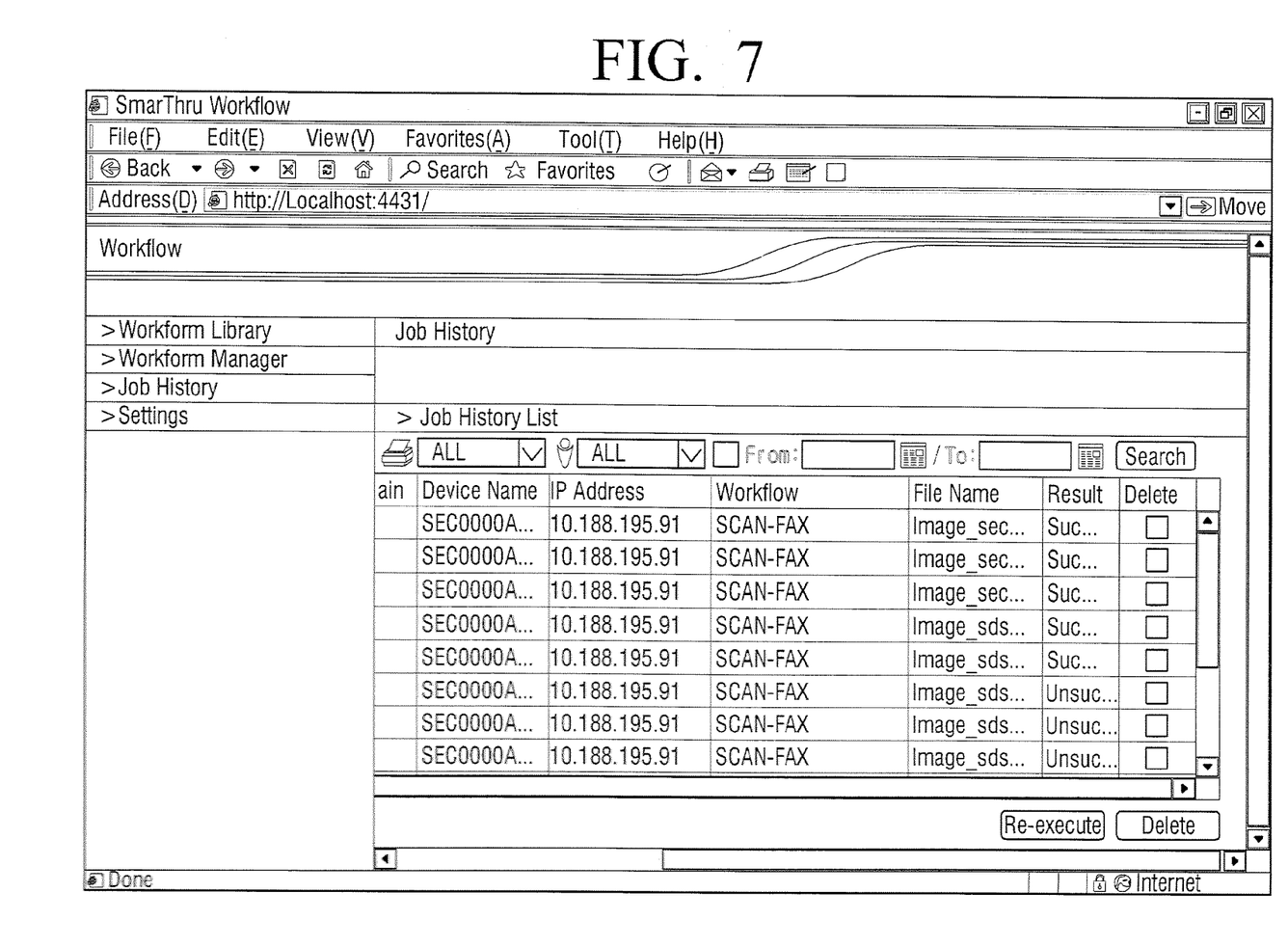
FIG. 7 illustrates a plurality of jobs performed in response to a user request and a result of performing the plurality of jobs according to an exemplary embodiment of the present general inventive concept.

Additionally, the user may request re-execution of workflows using the job history in the host device 100 or the server 200, as illustrated in FIG. 7. In more detail, the user can access the server 200 using the host device 100, and log onto a web page of the server 200.

If the user requests the job history from the server 200, the server 200 can transmit a web page illustrated in FIG. 7 to the host device 100. The host device 100 may drive a web browser to display the web page received from the server 200 as illustrated in FIG. 7. FIG. 7 illustrates a plurality of jobs performed in response to a user request and a result of performing the plurality of jobs. If the user selects one or more jobs he or she desires to re-execute and presses a 'Re-execute' button from the web page illustrated in FIG. 7, the host device 100 can transmit a request to re-execute the one or more selected jobs to the first to n-th image forming apparatuses 300-1, 300-2, . . . , 300-*n*.

The 'Re-execute' button may be set to enable a user to select unsuccessful jobs, namely jobs in which image scanning was successful but other operations after scanning such as printing, e-mailing, or storing were not successfully performed, so that the selected jobs may be re-executed. For example, if 'Scan to Print' is executed, an image may be scanned but printing of the scanned image may be unsuccessfully performed. In this situation, if the user presses the 'Re-execute' button, the server 200 may select jobs, in which image scanning was successful but printing was unsuccessful, from the job history list, and may control the selected jobs to be re-executed. In this case, scanned data is stored in the server 200, so jobs may be re-executed rapidly.

Figure 8:
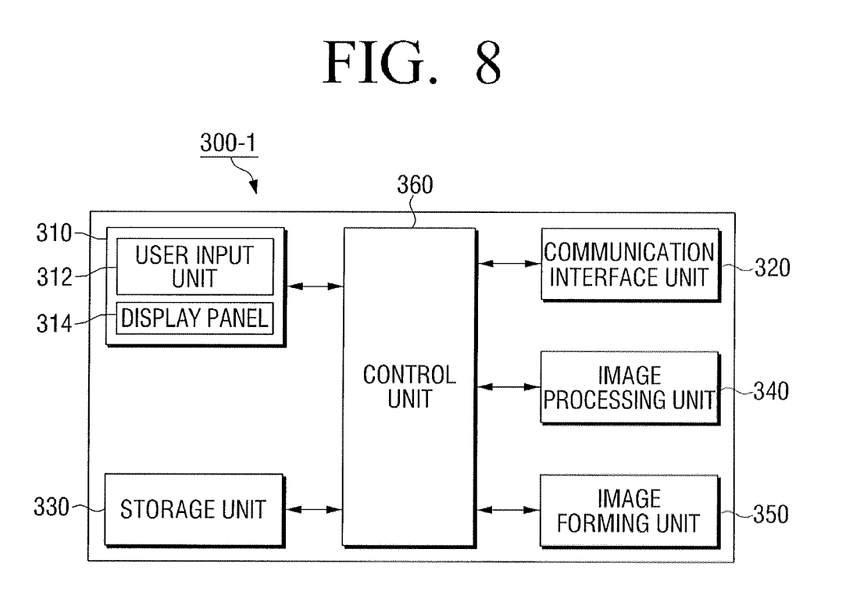
FIG. 8 illustrates a block diagram of a first image forming apparatus able to re-execute a workflow according to another exemplary embodiment of the present general inventive concept.

FIG. 8 illustrates a block diagram of the first image forming apparatus 300-1 able to re-execute a workflow according to another exemplary embodiment of the present general inventive concept.

In FIG. 8, the first image forming apparatus 300-1 includes an operating panel unit 310, a communication interface unit 320, a storage unit 330, an image processing unit 340, an image forming unit 350, and a control unit 360. The operating panel unit 310, communication interface unit 320, storage unit 330, image processing unit 340, and image forming unit 350 are the same as or similar to the operating panel unit 310, communication interface unit 340, ROM 320, RAM 330, image processing unit 350, and image forming unit 360 illustrated in FIG. 3, so no further description thereof is required.

The storage unit 330 can store a job history received from the host device 100 or the server 200. If the user requests a display of the job history, the control unit 360 may allow the job history stored in the storage unit 330 to be directly displayed on the display panel 314 without requesting the job history from the host device 100 or the server 200. Additionally, if the user requests updating of the job history stored in the storage unit 330 through a menu screen (not illustrated), the control unit 360 can access the server 200 so as to receive a new job history and display the received job history.

Although a few embodiments of the present general inventive concept have been illustrated and described, it will be appreciated by those skilled in the art that changes may be made in these embodiments without departing from the principles and spirit of the general inventive concept, the scope of which is defined in the appended claims and their equivalents.

What is claimed is:

1. A method of re-executing a workflow in an image forming apparatus, the method comprising:
    accessing a job history of one or more workflows including a plurality of jobs, with at least two of the plurality of jobs being different operations of the image forming apparatus, and the job history comprising information about whether or not each of the workflows was executed successfully;
    displaying the accessed job history on a screen of the image forming apparatus, the screen comprising a menu to receive a workflow re-execution command;
    selecting one or more of the workflows to be re-executed or deleted from the displayed job history that displays the information about whether or not each of the workflows was executed successfully;
    changing conditions of an operation for re-executing the selected workflow according to one or more selections received from a displayed menu, including at least one of input conditions including at least one of a scan operation and a facsimile operation, transform conditions including at least optical character recognition, and transmission conditions including at least one of an e-mail operation, a folder operation, a facsimile operation, and a print operation; and
    re-executing the selected workflow according to the changed conditions.

2. The method as claimed in claim 1, wherein the job history is stored in at least one of the image forming apparatus, a server of the workflow, and one or more host devices connected via a network to the image forming apparatus.

3. The method as claimed in claim 2, wherein:
    the job history is stored in the image forming apparatus or the one or more host devices; and
    the accessing of the job history further comprises:
        determining whether to update the job history;
        updating the job history and accessing the updated job history, if the result of the determination is to update the job history; and
        accessing the job history, if the result of the determination is not to update the job history.

4. The method as claimed in claim 1, wherein the displaying of the accessed job history comprises classifying the one or more workflows of the job history into successful workflows and unsuccessful workflows and displaying the classified workflows.

5. The method as claimed in claim 1, further comprising, after the executing of the workflow:
    adding a result of re-executing the selected workflow to the job history stored in the at least one of the image forming apparatus, server of the workflow, and one or more host devices.

6. The method as claimed in claim 1, wherein the accessing of the job history comprises:
    requesting for a user to access the job history using the image forming apparatus; and
    performing user authentication to access the job history.

7. An image forming apparatus able to re-execute a workflow, comprising:
    a communication unit to be connected to a server or host device in which a job history illustrating a result of executing one or more workflows is stored, and to receive the stored job history, the workflows including a plurality of jobs, with at least two of the plurality of jobs being different operations of the image forming apparatus;
    a display unit to display the received job history, the job history comprising information about whether or not each of the workflows was executed successfully, and the displayed job history comprising a menu to receive a workflow re-execution command;
    a user input unit to receive input selecting one or more of the workflows to be re-executed or deleted from the displayed job history that displays the information about whether or not each of the workflows was executed successfully, the user input unit to receive a selection to change conditions of an operation to re-execute the selected workflow according to one or more selections received from a displayed menu, including at least one of input conditions including at least one of a scan operation and a facsimile operation, transform conditions including at least optical character recognition, and transmission conditions including at least one of an e-mail operation, a folder operation, a facsimile operation, and a print operation; and
    a control unit to control the selected workflow to be re-executed according to the changed conditions.

8. The image forming apparatus as claimed in claim 7, wherein the control unit classifies the one or more workflows of the job history into successful workflows and unsuccessful workflows and displays the classified workflows on the display unit.

9. The image forming apparatus as claimed in claim 7, wherein the server or host device records onto the job history a result of re-executing the selected workflow transmitted from the communication unit.

10. The image forming apparatus as claimed in claim 7, wherein the communication unit receives the job history from the host device if a user logs onto the host device through a user authentication process.

11. The image forming apparatus as claimed in claim 7, wherein the host device receives the job history from the server, stores the received job history, and transmits the job history to the communication unit.

12. An image forming apparatus able to re-execute a workflow, comprising:
    a storage unit to store a job history illustrating a result of executing one or more workflows, where the workflows including a plurality of jobs, with at least two of the plurality of jobs being different operations of the image forming apparatus;
    a display unit to display the stored job history, the job history comprising information about whether or not each of the workflows was executed successfully, and the displayed job history comprising a menu to receive a workflow re-execution command;
    a user input unit to receive input selecting one or more of the workflows to be re-executed or deleted from the displayed job history that displays the information about whether or not each of the workflows was executed successfully, the user input unit to receive a selection to change conditions of an operation to re-execute the selected workflow according to one or more selections received from a displayed menu, including at least one of input conditions including at least one of a scan operation and a facsimile operation, transform conditions including at least optical character recognition, and transmission conditions including at least one of an e-mail operation, a folder operation, a facsimile operation, and a print operation; and a control unit to control the selected workflow to be re-executed according to the changed conditions.

13. The image forming apparatus as claimed in claim 12, wherein the display unit displays a screen to determine whether to update the job history, and if a user determines to update the job history, the control unit updates the job history and displays the updated job history, and if the user determines not to update the job history, the control unit controls the display unit to display the stored job history.

14. The image forming apparatus as claimed in claim 12, wherein the control unit classifies the one or more workflows of the job history into successful workflows and unsuccessful workflows and displays the classified workflows on the display unit.

15. The image forming apparatus as claimed in claim 12, wherein the control unit adds a result of re-executing the selected workflow to the job history.

16. A method of re-executing a workflow, the method comprising:

a user connecting to a server in which a job history illustrating a result of executing one or more workflows is stored, using a user terminal, the workflows including a plurality of jobs, with at least two of the plurality of jobs being different operations of the image forming apparatus;

receiving the stored job history from the server and displaying the received job history, the receiving performed by the user terminal, the job history comprising information about whether or not each of the workflows was executed successfully, wherein displaying includes displaying the job history on a preset screen, the displayed job history comprising a menu to receive a workflow re-execution command;

selecting one or more of the workflows to be re-executed or deleted from the displayed job history that displays the information about whether or not each of the workflows was executed successfully;

changing conditions of an operation for re-executing the selected workflow according to one or more selections received from a displayed menu, including at least one of input conditions including at least one of a scan operation and a facsimile operation, transform conditions including at least optical character recognition, and transmission conditions including at least one of an e-mail operation, a folder operation, a facsimile operation, and a print operation; and re-executing the selected workflow according to the changed conditions.

17. The method as claimed in claim 16, wherein the job history displayed on the user terminal is a web page.

* * * * *